United States Patent Office 2,812,837
Patented Nov. 12, 1957

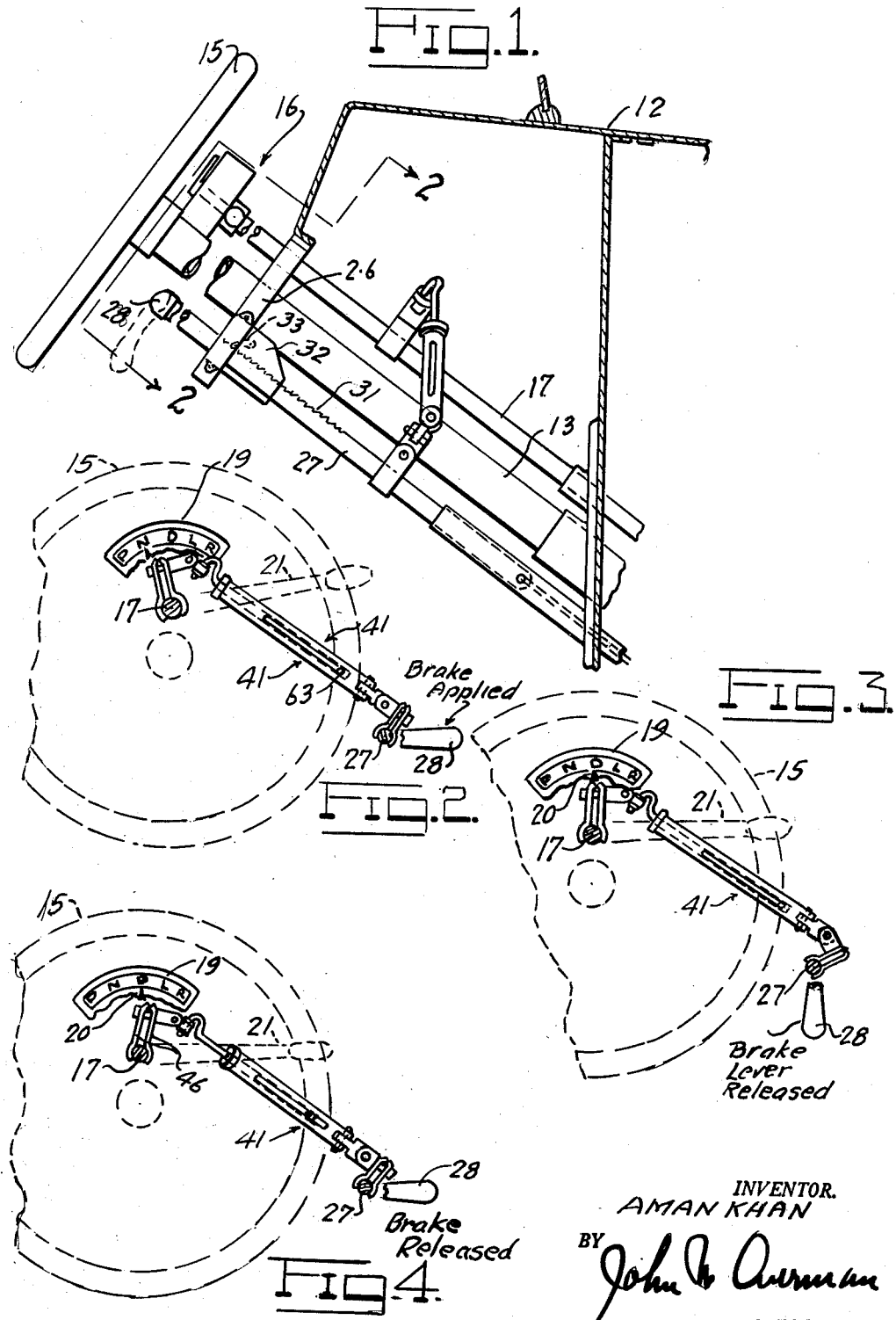

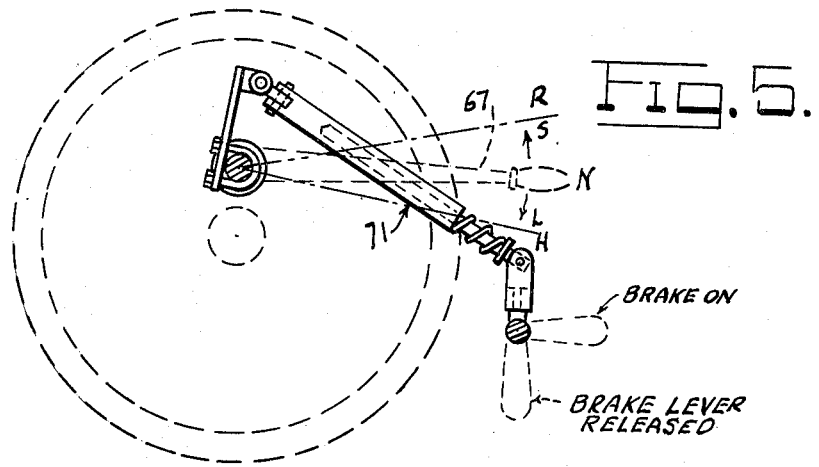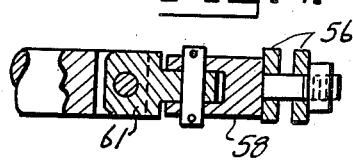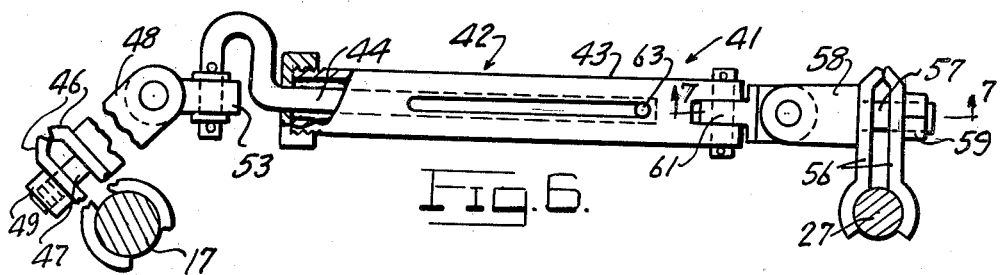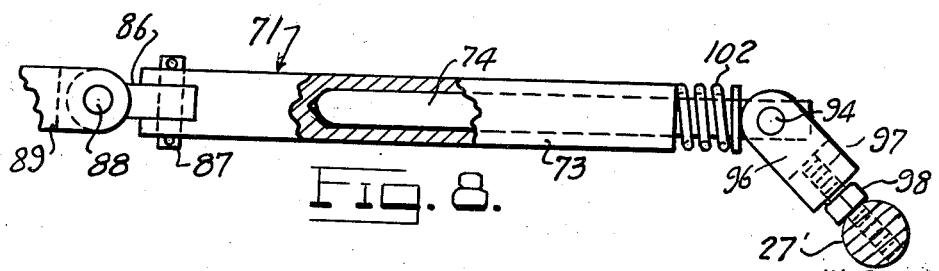

2,812,837

INTERLOCK FOR TRANSMISSION CONTROL AND HAND BRAKE FOR AUTOMOBILES

Aman Ullah Khan, Toledo, Ohio

Application May 12, 1953, Serial No. 354,462

11 Claims. (Cl. 192—4)

This invention relates to automobile drive transmission and braking mechanism, and more particularly to an interlock for the transmission control device or gear shift lever and the lever or device for applying the parking or hand brake.

It is an object of the present invention to so interlock the transmission control device or gear shift lever and the parking or hand brake control device or brake lever that the transmission will not be placed in driving relationship and particularly forward driving relationship while the brake is set nor will the brake be set or applied while the transmission is in other than desired relation, for instance, neutral or "park" relation in the case of so-called automatic transmissions.

Another object of the invention is to provide such an interlock that is useful with not only the newer or automatic transmissions but is also a valuable improvement to the older transmissions, i. e., those provided with the conventional manual gear shift lever. In both types of transmissions it guards against the operator putting the car in motion without having released the emergency or hand brake.

It is a further object of the invention to provide an interlock that so interconnects the gear shift lever and the brake lever that movement of the gear shift lever to one of the driving positions automatically effects release of the hand brake, and movement of the hand brake lever automatically returns the gear shift lever to neutral position.

It is another object of this invention to interlock the gear shift lever and the hand brake lever by interconnecting them through means that do not interfere with the operation of either nor cause any perceptible drag on or resistance to movement of these levers.

It is a further object of the invention to provide such an interlock that may be readily and simply installed in automobiles already built and one that is adaptable to cars of various models and makes.

It is another object of the invention to provide such a device that may be applied to automobiles without substantial change in any part of the automobile.

It is a still further object of the invention to provide such a device that may be applied to many existing automobiles with the use of simple tools so that in many cases the car owner himself may install the device.

It is a still further object of the invention to provide such a device that assures that the hand brake is released when the gear shift lever is moved to a driving position.

These and other objects of the invention will be apparent from the following description and from the drawings, in which:

Figure 1 is a vertical sectional view through a part of an automobile body showing part of the steering mechanism, the transmission control device and the brake lever in elevation;

Figure 2 is a cross-sectional view of the same taken on the line 2—2 of Figure 1 showing the parts in the relationship corresponding to neutral position of the transmission control lever and brake-applied position of the brake control lever;

Figure 3 is a view similar to Figure 2 showing the parts in the relationship present when the transmission control lever is first shifted to drive position;

Figure 4 is another view similar to Figure 2 showing the parts in the relationship obtaining when the transmission control lever is in drive position and the brakes are fully released;

Figure 5 is a view similar to Figure 2 showing a modified form of the present invention and also showing the invention installed in an automobile having the manual transmission control or gear shift;

Figure 6 is an enlarged detail view of the device of the preferred form of the present invention;

Figure 7 is a detail sectional view of the same taken on the line 7—7 of Figure 6; and Figure 8 is a view similar to Figure 6 of the modified form of the present invention.

Referring to the drawings and particularly to Figure 1, the automobile body is represented generally at 12 and enclosed within the body in conventional way is the steering column 13 carrying at its upper end the conventional steering wheel 15. Forward of the steering column and in generally parallel relation therewith the gear shift mechanism 16 is mounted. This gear shift mechanism includes the conventional rod 17 which extends from just beneath the steering wheel to near the transmission case of the automobile and is connected in conventional manner with the transmission case so that when the rod 17 is rotated into various positions it effects changes in the gearing and drive connections of the mechanism in the transmission case to change the relationship of the driving mechanism between the engine and the wheels of the automobile.

The present invention is particularly useful in automobiles provided with the so-called "automatic" transmission in which the transmission control mechanism is set either in neutral position or in drive position and thereupon the shifting of the gears through the various relationships takes place automatically and without further manipulation by the driver. Such a transmission may also include a so-called "park" position where the driving mechanism to the wheels of the automobile is locked against movement, usually also includes a "low" position where the gear ratio is in so-called "low," and where automatic shifting of the gears from this relation does not take place, and includes also the conventional reverse position. In the drawings these positions of the shifting transmission are indicated by the initial letters in the legend 19. The gear shift rod has associated with it in some way an indicator such as the pointer 20 cooperating with the letters to inform the observer of the position of the transmission control mechanism.

The transmission control mechanism is provided with the hand lever or gear shift lever 21 which extends outwardly from the transmission control rod 17 and carries at its outer end a hand grip in the vicinity of the rim of the steering wheel 15.

To one side of the steering column 13 a hand brake mechanism for manually setting the emergency or parking brake is located. This mechanism includes a support 26 suitably secured in place to the body of the automobile and a rod 27 which slides in the support 26. The lower end of the rod has a cable or other suitable connection with the brake mechanism of the automobile so that when the rod is drawn outwardly and upwardly the brakes are applied. The rod is provided at its outer end with a handle 28 and also along its upper face has a plurality of notches 31 which cooperate with a ratchet mechanism 32 which includes a spring pressed pawl 33 that cooperates with the notches to hold the brake rod 27 in any position to which it has been drawn outwardly. To release the brakes the rod 27 is turned by means of the handle 28 so that the notches 30 are moved out of reach of the pawl 33 with the result that the rod is free to slide downwardly and release the brakes. The springs included in the brake mechanism and otherwise present in the braking system and thereby connected with the rod 27 urge the rod into retracted or downward position in its sliding support so that upon rotation of the rod and freeing of the notches from the pawl, the rod is quickly drawn downwardly by the spring action and the brakes are released. In some cases it may be necessary to increase the strength of the springs responsible for this action or to install additional springs.

The mechanism so far described is conventional in most contemporary automobiles and although details may vary in different makes of automobiles, the general arrangements of parts is substantially the same. One change from the arrangement of mechanism so far described herein is that the brake lever may be on the left hand side of the steering column instead of on the right hand side as shown in Figures 1 and 2. This is usually, however, only a change in location and in all other respects the mechanism is the same and operates in the same manner as that described, and the present invention is equally useful therewith.

As can be seen by reference to Figures 1, 2 and 3, the gear shift lever is adapted to be placed into a so-called neutral position indicated by the letter "N" shown on these views and by the position of the pointer 20 shown in Figure 2. The gear shift lever may be moved either direction from this neutral position. If it is moved to the right or in clockwise direction, the transmission mechanism goes to a so-called drive or "D" position where drive connection between the engine and the wheels of the automobile is made. Still further movement in a clockwise direction may move the transmission into a so-called low or "L" position where the mechanism is maintained in the highest gear ratio and where the automatic shifting mechanism is inoperative to change the gear ratio from this high relationship. There is also a reverse or "R" position where the reverse gear comes into operation and the transmission is effective to drive the automobile backward. Some transmissions also include a park or "P" position where the driving mechanism of the automobile is unclutched or disconnected from the engine and is instead held against rotation so that the automobile cannot roll.

The present invention is effective to avoid placing the transmission in driving, low or reverse relation while the parking brake is on or set. If such movement of the transmission control mechanism is made without first having manually released the brake, then the brake is automatically released upon movement of the gear shift lever to any position to the right of neutral. On the other hand, movement of the gear shift lever to park position from neutral position does not result in release of the brake.

The invention also assures that whenever the emergency or parking brake is set or applied, the transmission mechanism will automatically be put into neutral position if the brake is set or applied while the transmission has been in any one of driving, low or reverse positions. If the transmission mechanism was in neutral or park position at the time the hand brake is applied, the mechanism is not affected.

This interlock between the transmission control mechanism and the hand brake or emergency brake is achieved by providing a linkage 41 between the two so constructed that movement of one or the other in a certain way automatically changes the other to its proper corresponding position. Referring to Figures 1, 2 and 7, this linkage includes an extensible or telescoping link 42 made up of an outer part or sleeve 43 and an inner rod 44. This extensible link is connected at one end to the gear shift rod 17 and at the other end to the brake rod 27. Preferably the inner rod 44 of the link is connected to the gear shift rod while the sleeve 43 is secured to the brake lever although this arrangement of parts may be reversed if desired.

The inner rod 44 of the link is preferably connected to the gear shifting rod by means of a releasable connection which permits the device to be installed on automobiles already constructed and without any substantial change in the parts. This connection includes a pair of clamp bars 46 adapted at one of their ends to fit around or grasp the gear shift rod and being adapted at their other ends to bear on each other to form a fulcrum. Intermediate their ends the clamp bars are provided with openings through which the threaded shank 47 of a clevis 48 is passed. A nut 49 is threaded over the shank of the clevis and when tightened forces the clamp bars against the shoulder 51 formed by the main body of the clevis and in this way moves the swinging ends of the clamp bars toward each other and tightly grips between them the gear shift rod 17.

The end of the sliding rod 44 is bent so as to extend transversely to the main body of the rod and is connected by means of a link 53 with the clevis 48. The link is preferably formed with openings therethrough which are at right angles to each other so that in effect there is formed a universal joint between the clevis and the end of the rod 44 of the linkage 41.

While other means may be provided for securing the end of the sliding rod to the gear shift rod 17, the means herein provided are preferable in that they make attachment of the rod quite simple and easy and require no tools other than a wrench or the like and this particular form of connection provides also effortless movement of the parts without binding or undue friction so that the effect on the normal movement of the transmission control mechanism is unnoticeable.

The connection of the other end of the extensible link, that is, the sleeve 43 to the brake rod 27, is accomplished by a similar mechanism. Here a pair of clamp bars 56 are provided to grip the brake rod 27 between them at one of their ends and are shaped to form between them a fulcrum at the other of their ends. Intermediate their ends there are openings through them to receive the threaded shank 57 of the clevis 58 and a nut 59 is threaded over the shank to force the clamp bars toward each other and thereby grip the brake rod between them. A link 61 having openings through opposite ends, which opening are related at 90° to each other, is provided to connect by means of pivot pins the end of the sleeve 43 of the linkage to the clevis 58. Here again this particular connection provides in effect a universal joint which permits ease of movement of the parts.

With the gear shift lever 21 in the neutral position and the brake lever in brake applied or set position, the parts are as shown in Figure 2. The linkage 41 is at the limit of its lengthwise contraction, that is, the rod 44 of the linkage is at the limit of its movement into the sleeve 43. This limit may be fixed by providing a pin 63 passing through the rod 44 near its end and projecting laterally from the rod at least to one side. The projecting pin is slidably received in slots 64 at one or both sides of the sleeve 43, the length of the slot defining the length of movement of the rod in the sleeve.

In operation of this device, when the gear shift lever is moved from neutral position to the right and to drive, reverse or low position, the linkage 41 rotates the brake rod with the gear shift lever and thereby releases the brake rod from the pawl 33 of the ratchet mechanism. The parts are then in the position shown in Figure 3. Immediately upon rotation of the brake rod the rod is pulled downwardly under the conventional spring means in the brake applying mechanism so that the brakes are released. The downward movement of the brake rod causes the linkage to extend by outward movement of the rod 44 with respect to the sleeve 43. The brake rod also returns to its normal angular position. This relation of parts is shown in Figure 4.

With the brake rod in the brake released position shown in Figure 4 and with the rod 44 telescoped out of the sleeve 43, as also shown in that figure, the gear shift lever may be moved into any position and the relative sliding movement of the rod and the sleeve permits such angular movement of the gear shift lever without reacting on the brake rod and this sliding movement is so easily effected that no perceptible drag is placed on movement of the gear shift lever.

Releasing of the hand brake as just described, with the parts in the relative positions shown in Figure 4, makes its possible to set the hand brake merely by pulling the brake rod outwardly in the conventional way. When this is done the rod 44 of the linkage 41 telescopes into the sleeve 43 until the end of such movement is reached, that is, when the pin 63 reaches the ends of the slots 64. At this point the sleeve and rod move together as a unit and continuing upward movement of the brake rod forces the gear shift lever to rotate until it reaches neutral position. In this way the brake cannot be set with the gear shift lever left in drive position, and the act of setting of the hand brake automatically effects return of the drive transmission to neutral position. Because of this the invention assures that the transmission will not be put in driving relation while the hand brake is on, and also that applying the hand brake brings the transmission back to neutral position.

Referring to Figure 5 of the drawings, the present invention in modified form is shown in association with the older type or so-called manual gear shift mechanism of an automobile. Here the gear shift lever 67 may be moved into any one of five positions with neutral as the center position. Moved counterclockwise from neutral and upwardly it is moved into reverse, and counterclockwise and downwardly it is moved into second. If it is moved clockwise and upwardly it is moved into so-called low gear, and if it is moved clockwise and downwardly it is moved into high gear. The linkage 71 connecting this gear shift lever and its associated rod 17' with the brake rod 27' operates in substantially the same way as that previously described. However in this case the brake rod is rotated and released from the ratchet mechanism only when the gear shift lever is moved clockwise and into either low or high gear. Upon such movement of the lever the release of the hand brake takes place in the way described in connection with Figures 1 to 4 of the drawings.

When the gear shift lever is moved to the other two positions from neutral, namely into second or into reverse, the linkage 71 is free to extend and there is no effect on the hand brake. This has the advantage of permitting the automobile to be put into gear, that is either second or reverse, when it is parked and at the same time have the hand brake lever in brake-applied position. In other respects the apparatus shown in this figure operates in much the same way as that previously described in that if the gear shift lever is in either first or high at the time the automobile is stopped, the latter being ordinarily the case, then application of the hand brake automatically shifts the gear shift lever into neutral position.

The linkage 71 shown in this Figure 5 and in Figure 8 is composed of the sleeve 73 and the rod 74 which slides therein. The inner end of the rod abuts the bottom of the axial opening in the sleeve to thereby limit inward movement of the rod into the sleeve. The sleeve is connected at one end by means of a universal connection 81 to the outer end of a bar 83 which in turn is fastened in selected angular relation to the gear shift rod 17' by means of a U-bolt 84 which embraces the rod.

The universal joint 81 between this end of the sleeve 73 and the gear shift rod 17' is achieved by a link 86 connected to the sleeve 73 in the bifurcated end thereof by a pivot pin 87 and having a second pivot pin 88 connecting the link with a clevis 89 bolted by means of a threaded shank 91 and a nut 92 to the bar 83. The axis of the pivot pin connection between the clevis and the link is at right angles to the axis of the pivot pin connection between the link and the sleeve so that the universal joint effect is obtained. At the opposite end of this linkage 71 the end of the rod 74 is provided with an opening to receive a pivot pin 94 which is received in aligned openings in a clevis 96 which in turn is provided with a threaded opening 97 in the base thereof and which is received over a threaded stud 98 projecting from the brake rod 27'. The base of the clevis 96 is free to rotate on the stud 98 so that in association with the pivoted connection between the end of the rod 74 and the clevis a universal joint effect is obtained.

In certain makes of automobiles the brake rod is biased by means of a spring to return to its central position whenever it is rotated to be released from the ratchet mechanism. Sometimes this spring biasing is so strong that the rod tends to snap back to its central position and thereby become reengaged with the ratchet mechanism before it has reached the end of its brake-releasing lengthwise movement. In the present invention this tendency of the brake rod is overcome by providing spring means which are sufficient to overcome the biasing effect of the spring on the brake rod and maintain it in rotated position free of release reengagement with the ratchet mechanism until it has at least substantially completed its brake-releasing lengthwise movement.

For this purpose a spring 102 is received about the rod 74 and seats at one end against a washer 103 received about the rod and held against movement endwise of the rod by the bifurcated end of the clevis 96. The other end of the spring 102 seats against the end of the sleeve 73. The spring is of sufficient force to urge the brake rod to rotate against the action of the spring normally biasing it to normal or center position but is of insufficient force to initiate movement of the rod from its engagement with the ratchet mechanism. As a result the spring 102 has no effect until the gear shift lever is moved into a position which forces the brake rod to rotate and be released from the ratchet mechanism. The spring 102 then tends to maintain the brake rod in this rotated position until it is moved downwardly sufficiently to be free of the ratchet mechanism whereupon it can continue to complete its brake-releasing movement. The spring also has the advantage of keeping the parts under some pressure so that rattling and subsequent noise of the parts is effectively reduced.

These and other modifications of the invention may be made within the scope thereof as defined by the appended claims.

I claim:

1. An interlock for the brakes and transmission of a self-propelled vehicle wherein a power transmission mechanism has a controller therefor shiftable from a neutral position to a driving position and wherein a brake-applying device is movable in one direction to apply the brakes and is held in brake-applied position by means releasable upon rotative movement of said brake-applying device to permit movement thereof in the other direction to thereby release the brakes, said interlock comprising a motion-transmitting connector between the brake-applying device and the controller arranged to rotate the brake-applying device upon rotation of the controller to effect release of the device from the releasable means, thereby permitting movement of the device in brake releasing direction.

2. An interlock for the brakes and transmission of a self-propelled vehicle of the kind having a power transmission mechanism and a controller therefor shiftable rotatably from a neutral position to a driving position and a brake-applying device rotatable to release the brakes, said interlock comprising an arm to be attached to and extend radially from the controller, an arm to be attached to and extend radially from the brake rod, and a link connecting the free ends of said arms whereby rotation of the controller for the transmission from neutral to a drive position causes rotation of the brake-applying device to effect release of the brakes.

3. An interlock for the brakes and transmission of a self-propelled vehicle wherein a power transmission mechanism has a controller therefor shiftable rotatably from a neutral position to a driving position and wherein a brake-applying device includes a rod reciprocable lengthwise to apply and release the brakes and that is held in brake-applied position by a cooperating detent and being rotatable to effect release from said detent to thereby release the brakes, said interlock comprising a motion-transmitting connector between the brake-applying rod and the controller arranged to rotate the brake-applying rod upon rotation of the controller to effect release of the rod from the detent, thereby permitting reciprocable movement of the rod and release of the brakes, said motion-transmitting connector incorporating a sliding articulation to maintain connection between the controller and the brake-applying rod during reciprocable movement of the rod.

4. An interlock for the brakes and transmission of a self-propelled vehicle wherein a power transmission mechanism has a controller therefor shiftable rotatably from a neutral position to a driving position and wherein a brake-applying device includes a rod reciprocable lengthwise to apply and release the brakes and that is held in brake-applied position by a cooperating detent and being rotatable to effect release from said detent to thereby release the brakes, said interlock comprising an arm extending radially from the controller, an arm extending radially from the brake rod, and a link connecting the free ends of said arms whereby rotation of the controller for the transmission from neutral to drive position causes rotation of the brake-applying rod to effect release thereof from the detent, permitting reciprocable movement of the rod and release of the brakes.

5. An interlock for the brakes and transmission of a self-propelled vehicle wherein a power transmission mechanism has a controller therefor shiftable rotatably from a neutral position to a driving position and wherein a brake-applying device includes a rod reciprocable lengthwise to apply and release the brakes and that is held in brake-applied position by a cooperating detent and being rotatable to effect release from said detent to thereby release the brakes, said interlock comprising an arm extending radially from the controller, an arm extending radially from the brake rod, and an extensible link connecting the free ends of said arms whereby rotation of the controller for the transmission from neutral to drive position causes rotation of the brake-applying rod to effect release thereof from the detent, permitting reciprocable movement of the rod and release of the brakes.

6. An interlock for the brakes and transmission of a self-propelled vehicle wherein a power transmission mechanism has a controller therefor shiftable rotatably from a neutral position to a driving position and wherein a brake-applying device includes a rod reciprocable lengthwise to apply and release the brakes and that is held in brake-applied position by a cooperating detent and being rotatable to effect release from said detent to thereby release the brakes, said interlock comprising an arm extending radially from the controller, an arm extending radially from the brake-applying rod, and a link composed of telescoping sections and connecting the free ends of said arms whereby rotation of the controller for the transmission from neutral to drive position causes rotation of the brake-applying rod to effect release thereof from the detent, permitting reciprocable movement of the rod and release of the brakes.

7. An interlock for the brakes and transmission of a self-propelled vehicle wherein a power transmission mechanism has a controller therefor shiftable rotatably from a neutral position to a driving position and wherein a brake-applying device includes a rod reciprocable lengthwise to apply and release the brakes and that is held in brake-applied position by a cooperating detent and being rotatable to effect release from said detent to thereby release the brakes, said interlock comprising an arm releasably clamped to and extending radially from the controller, an arm releasably clamped to and extending radially from the brake-applying rod, and a link composed of telescoping sections and connecting the free ends of said arms whereby rotation of the controller for the transmission from neutral to drive position causes rotation of the brake-applying rod to effect release thereof from the detent, permitting reciprocable movement of the rod and release of the brakes.

8. An interlock for the brakes and transmission of a self-propelled vehicle wherein a power transmission mechanism has a controller therefor shiftable rotatably from a neutral position to a driving position and wherein a brake-applying device including a rod reciprocable lengthwise to apply and release the brakes and that is held in brake-applied position by a cooperating detent and being rotatable to effect release from said detent to thereby release the brakes, said interlock comprising a motion-transmitting connector between the controller and the brake-applying rod, said connector including telescoping sections so as to make the connector extensible, and a stop limiting contracting movement of said sections whereby rotation of the controller for the transmission from neutral to drive position causes rotation of the brake-applying rod to effect release thereof from the detent, permitting reciprocable movement of the rod and release of the brakes.

9. An interlock for the brakes and transmission of a self-propelled vehicle of the kind having a power transmission mechanism and a controller therefor shiftable rotatably from a neutral position to a driving position and a brake-applying device including a rod reciprocable lengthwise to apply and release the brakes and held in brake-applied position by a cooperating detent and being rotatable to effect release from said detent to thereby release the brakes, said interlock comprising an arm extending radially from the controller, an arm extending radially from the brake rod, and an extendable link connecting the free ends of said arms by universal joints whereby rotation of the controller for the transmission from neutral to drive position causes rotation of the brake-applying rod to effect release thereof from the detent permitting reciprocable movement of the rod and release of the brakes.

10. An interlock for the brakes and transmission of a self-propelled vehicle of the kind having a power transmission mechanism and a controller therefor shiftable rotatably from a neutral position to a driving position and a brake-applying device including a rod reciprocable lengthwise to apply and release the brakes and held in brake-applied position by a cooperating detent and being rotatable to effect release from said detent to thereby release the brakes, said interlock comprising a rod movable lengthwise and connected with the controller to move lengthwise in one direction when the controller is shifted rotatably from neutral to a driving position, an abutment secured to the brake rod and spaced radially from the rod, the abutment arranged to be contacted by the movable rod when said rod moves in one direction whereby rotation of the controller for the transmission from neutral to drive position causes rotation of the brake-applying rod to effect release thereof from the detent permitting reciprocable movement of the rod and release of the brakes.

11. An interlock for the brakes and transmission of a self-propelled vehicle wherein a power transmission mechanism has a controller therefor shiftable rotatably from a neutral position to a driving position and wherein a brake-applying device includes a rod reciprocable lengthwise to apply and release the brakes and that is held in brake-applied position by a cooperating detent and being rotatable to effect release from said detent to thereby release the brakes, said interlock comprising an arm releasably clamped to and extending radially from the controller, an arm releasably clamped to and extending radially from the brake-applying rod, a link composed of telescoping sections and connecting the free ends of said arms whereby rotation of the controller for the transmission from neutral to drive position causes rotation of the brake-applying rod to effect release thereof from the detent, permitting reciprocable movement of the rod and release of the brakes, and a spring urging said telescoping sections apart.

References Cited in the file of this patent

UNITED STATES PATENTS

| | | |
|---|---|---|
| 1,614,367 | Jackson | Jan. 11, 1927 |
| 2,550,403 | Carmichael | Apr. 24, 1951 |
| 2,632,338 | Sandberg | Mar. 24, 1953 |
| 2,656,025 | Martin | Oct. 20, 1953 |